April 29, 1952

W. C. UHRI 2,594,599

TANK OPENING ASSEMBLY

Filed April 12, 1948

INVENTOR.
William C. Uhri
BY
Andrus & Scales
ATTORNEYS.

Patented Apr. 29, 1952

2,594,599

UNITED STATES PATENT OFFICE 2,594,599

TANK OPENING ASSEMBLY

William C. Uhri, Milwaukee, Wis., assignor to A. O. Smith Corporation, Milwaukee, Wis., a corporation of New York Application April 12, 1948, Serial No. 20,382

7 Claims. (Cl. 220—64)

This invention relates to water-tight seals for tank openings and has particular reference to seals for mounting heating elements or thermostats and the like in enamel-lined hot water storage heaters.

One object of the invention is to provide a serviceable and dependable seal for an element opening in the wall of a ceramic or other enamel-lined water tank.

Another object is to provide a dependable and serviceable seal which is inexpensive to manufacture and is easily assembled and installed on the tank.

Another object is to provide a seal requiring a minimum of expensive stainless steel parts.

Another object is to provide a seal employing metal parts which are ceramic enameled or plated to protect the exposed portions thereof.

Another object is to provide a seal employing a gasket which is easily installed and which may be replaced at any time.

Another object is to provide a seal which completely covers a substantial area of the tank wall surrounding the opening therein so that portions of the tank exposed by imperfections, which may tend to develop in the enamel immediately around the opening, are protected from corrosion by the water.

Other objects of the invention will appear hereinafter in connection with the following description of the invention, as illustrated in the accompanying drawing.

Figure 1:
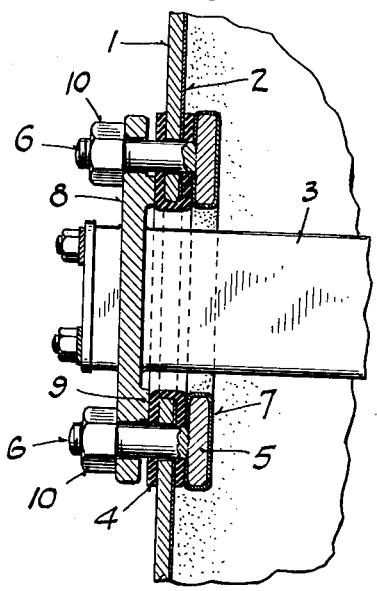
Figure 1 is a longitudinal sectional view of a wall of a hot water storage tank and showing the invention as applied to an opening therein.
Figure 2:
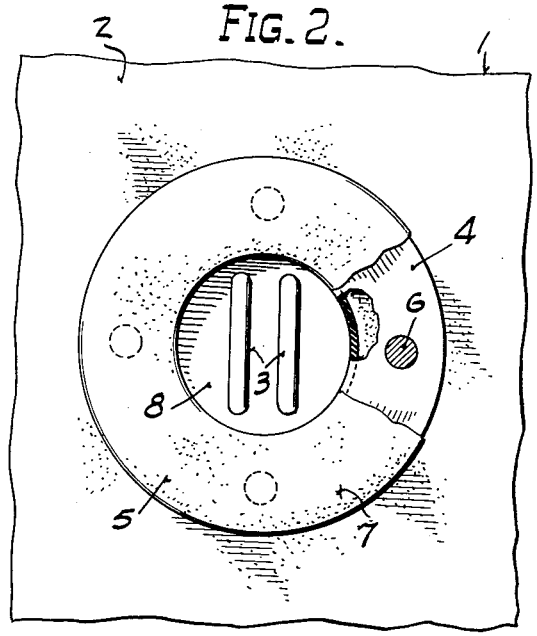
Fig. 2 is an inside elevational view of the installation illustrated in Figure 1, parts being broken away and sectioned.
Figure 3:
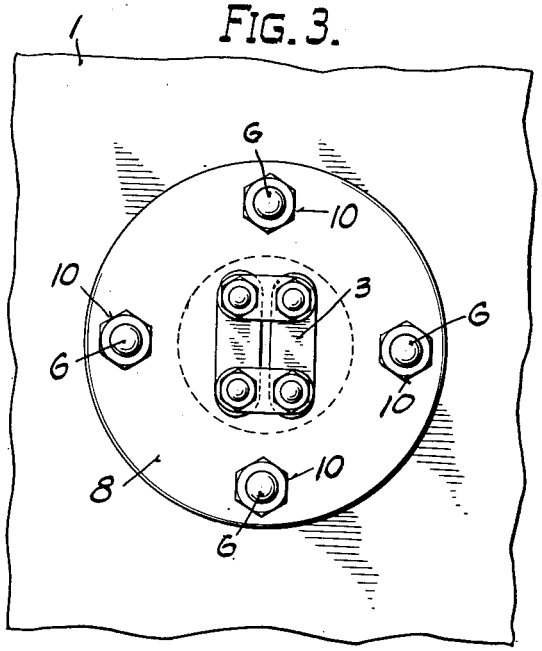
Fig. 3 is an elevational view of the installation illustrated in Figure 1 taken from the outside of the tank.

Referring to the drawing, there is shown a portion of the wall 1 of a hot water tank which has a protective lining 2 of ceramic enamel and an opening to receive the heating element 3.

The tank is of a metal likely to corrode in contact with fluid contained in the tank therefor it is necessary to support the thermostatic element 3 or any other member inserted in the tank opening in a seal assembly which prevents the contents of the tank from circulating to the exposed metal of the tank around the opening therein.

The seal assembly has a substantially resilient annular gasket 4 of general U-shape cross-section which fits over the edge of the tank around the opening and overlaps the wall of the tank radially on each side of the opening for a substantial distance. The gasket may be of neoprene or the like and is non-corrosive to prevent injury to the same by the contents of the tank.

A retaining ring 5 is disposed on the inside of the tank against gasket 4 to confine the gasket in place against the inside of the tank wall. A plurality of circumferentially spaced studs 6 are welded to ring 5 and project through aligned holes in gasket 4 on the inside and outside of the tank and the wall 1 of the tank around the opening therein. Retaining ring 5 has a thermal coefficient of expansion corresponding to that of the wall of the tank and may be of corrosion resistant alloy such as stainless steel. In the drawing, however, ring 5 is of carbon steel and is shown as coated with the ceramic enamel 7 to protect it from corrosion. The studs 6 are ordinarily nickel plated.

Heating element 3 has a plate member 8 of non-corrosive material which is provided with circumferentially spaced holes to receive studs 6 and close off the opening when asembled in place. Plate 8 has an annular flange 9 on the inside which engages the overlapping portion of gasket 4 around the edge of the opening on the outer surface of the tank and confines the gasket against the tank wall inside of studs 6.

The outer ends of studs 6 are threaded to receive nuts 10 and when the nuts are threaded home the seal assembly and heating element 3 are finally secured in place and plate 8 closes off the tank opening.

In making up a seal assembly such as that described, the wall 1 of the tank is first fabricated with an opening therein and with holes spaced circumferentially around the opening. The inside of the wall is then coated with enamel slip and the latter is fused thereto at temperatures approximating 1650° F. to provide the wall with the non-corrosive lining 2.

Thereafter gasket 4 is deformed to fit over the edge of the opening and overlap the tank wall on both the inside and outside for a substantial distance. Working from the inside, the previously prepared ring 5 with studs 6 welded thereto is assembled on the inside of the tank and studs 6 are projected through the holes in the tank wall and the previously provided holes in gasket 4. When in place, studs 6 extend outwardly of the tank for a substantial distance. Suitable means may be employed to hold ring 5 in place until the assembly of thermostatic element 3 is complete. However, by providing the holes in gasket 4 of slightly less size than studs 6 or off-setting the holes a slight amount, studs 6 will be retained and ring 5 will remain in position.

Plate 8 carrying element 3 is next slipped over the projecting ends of studs 6 until annular flange 9 of the plate engages gasket 4 around the opening on the outside of the tank. Nuts 10 are next assembled on the outer ends of studs 6 and threaded home to compress gasket 4 on the outside of the tank between flange 9 and wall 1 and on the inside between ring 5 and wall 1.

Gasket 4 when compressed seals off the approach of the contents of the tank to the exposed metal at the edge of the tank opening and fully protects the same from injury by corrosion. It also seals off approach to exposed metal in the stud holes in the tank wall.

Figure 4:
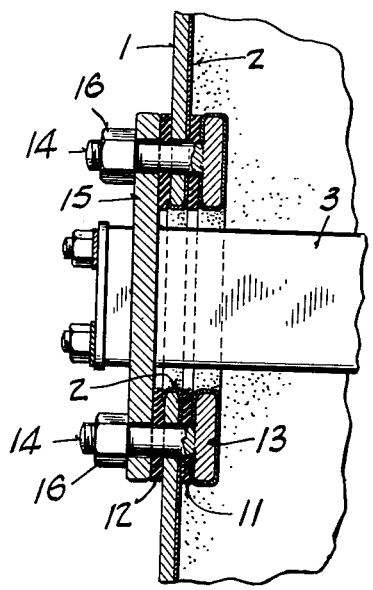
Fig. 4 is a view similar to Figure 1 showing another embodiment of the invention.

In the embodiment of the invention illustrated in Fig. 4, the edge of the opening in the tank wall 1 has been rounded off and ceramic enamel lining 2 of the tank extends around the edge to cover the same.

A gasket 11 is disposed on the inside of the tank around the opening and a separate gasket 12 is provided on the outside of the tank. Ring 13 is assembled against the inner gasket 11 and studs 14 extend through the tank wall and the inner and outer gaskets to receive the closure plate 15 of element 3 which engages gasket 12 on the outside of the tank.

In this embodiment the plate is shown without a flange engaging the outer gasket. The nuts 16 on the outer ends of studs 14 when threaded home compress the inner gasket 11 between ring 13 and wall 1 and the outer gasket 12 between plate 15 and wall 1 to seal off the approach of the contents of the tank to exposed metal.

The invention provides a simple and economical seal for a tank opening in which may be received spuds for connections, thermostatic and heating elements or a closure plate. The seal not only protects exposed metal at the edge of the tank opening from approach by corrosive fluid but also the metal of the tank at the holes through which the studs of the seal extend.

Various embodiments of the invention may be employed within the scope of the accompanying claims.

I claim:

1. A seal for an opening in the wall of a metal hot water storage tank having a protective lining extending over portions of the wall exposed to the hot water to protect the same from corrosion by the contents thereof, which comprises resilient corrosion resistant sealing means encircling the edge of said opening and overlapping the tank wall radially for a substantial distance on the inside and outside of the opening, a corrosion resistant ring member disposed inside the tank in engagement with said sealing means and having a plurality of circumferentially spaced studs projecting outwardly therefrom and through aligned holes in the sealing means and wall of the tank, a cover plate receiving said studs on the outside of the tank wall and closing said opening, and means secured to the ends of the studs to confine the plate and ring in place and compress the sealing means against the wall of the tank around the opening to prevent approach of contained fluid to exposed metal.

2. A seal for an opening in the wall of a metal hot water storage tank having a ceramic enamel lining to protect the same from corrosion by the contents thereof, which comprises a resilient corrosion resistant gasket extending across the edge face of the opening and from the edge of said opening and overlapping the tank wall radially for a substantial distance on the inside and outside of the opening, a corrosion resistant ring member disposed inside the tank in engagement with said gasket and having a plurality of circumferentially spaced studs projecting outwardly therefrom and through aligned holes in the gasket and wall of the tank, a cover plate receiving said studs on the outside of the tank wall and closing said opening, and means secured to the ends of the studs to confine the plate and ring in place and compress the gasket against the wall of said tank around the opening to prevent approach of contained fluid to exposed metal.

3. A seal for an opening in the wall of a metal hot water storage tank having a ceramic enamel lining on portions exposed to the hot water to protect the same from corrosion by the contents thereof, which comprises a resilient corrosion resistant sealing means encircling the edge of said opening and overlapping the tank wall radially for a substantial distance on the inside and outside of the opening, a corrosion resistant ring member disposed inside the tank in engagement with said sealing means and having a plurality of circumferentially spaced studs projecting outwardly therefrom and through aligned holes in the sealing means and wall of the tank, a cover plate receiving said studs on the outside of the tank wall to close said opening and having an annular flange engaging said sealing means around the edge of said opening inside said studs, and means secured to the ends of the studs to confine the plate and ring in place and compress the sealing means against the wall of said tank around the opening to prevent approach of contained fluid to exposed metal.

4. A seal for an opening in the wall of a metal hot water storage tank having a protective lining to protect the same from corrosion by the contents thereof, which comprises a resilient corrosion resistant gasket fitting over the edge of said opening and overlapping the tank wall radially for a substantial distance on both the inside and outside of said tank to cover said edge and the approach of the wall thereto, a corrosion resistant ring member disposed inside the tank in engagement with said gasket and having a plurality of circumferentially spaced studs projecting outwardly therefrom and through aligned holes in the gasket and wall of the tank, a cover plate receiving said studs on the outside of the tank wall and closing said opening, and means secured to the ends of the studs to confine the plate and ring in place and compress the gasket against the wall of said tank around the opening to prevent approach of contained fluid to exposed metal.

5. A seal for an opening in the wall of a metal hot water storage tank having a protective lining to protect the same from corrosion by the contents thereof with said lining extending over the edge face of the opening, which comprises a resilient corrosion resistant gasket extending radially from the tank opening for a substantial distance on the outside of the tank and a corresponding gasket extending similarly on the inside of the tank, a corrosion resistant ring member disposed inside the tank in engagement with said inner gasket and having a plurality of circumferentially spaced studs projecting outwardly therefrom and through aligned holes in said gaskets and the wall of the tank, a cover plate receiving said studs on the outside of the tank wall and closing said opening, and means secured to the ends of the studs to confine the plate and ring in place and compress the gaskets against the wall of the tank around the opening to prevent approach of contained fluid to exposed metal.

6. A seal for an opening in the wall of a metal tank having a lining of corrosion resistant ceramic enamel protecting the inner surface of the tank, a sealing gasket disposed within said opening and having circumferential flanges extending on both sides of the tank wall to cover a substantial surface of the tank radially of the opening, a ring disposed against the inner of said flanges, a cover plate disposed against the outside of said flanges and closing said opening, and studs extending from said ring through said gasket and the wall of the tank and adapted to secure said cover plate and ring together with the gasket and the rim of the tank opening tightly disposed therebetween.

7. A seal for an opening in the wall of a metal tank having a lining of corrosion resistant ceramic enamel protecting the inner surface of the tank, a sealing gasket disposed within said opening and having circumferential flanges extending on both sides of the tank wall to cover a substantial surface of the tank radially of the opening, a ring disposed against the inner of said flanges, a cover plate disposed against the outside of said flanges and closing said opening, and studs extending from said ring through holes in said gasket and the wall of the tank and adapted to secure said cover plate and ring together with the gasket and the rim of the tank opening tightly disposed therebetween, the diameter of the holes in the gasket being slightly smaller than the diameter of the studs to engage the studs and secure the ring in assembled position prior to the complete assembly of the seal.

WILLIAM C. UHRI.

REFERENCES CITED

The following references are of record in the file of this patent:

UNITED STATES PATENTS

| Number | Name | Date |
| --- | --- | --- |
| 1,391,396 | McMurtrie | Sept. 20, 1921 |
| 1,591,057 | Schwartz | July 6, 1926 |
| 2,064,963 | Wheeler | Dec. 22, 1936 |
| 2,170,712 | Goodwin | Aug. 22, 1939 |
| 2,330,306 | Murphy | Sept. 28, 1943 |
| 2,404,777 | Gaines | July 30, 1946 |
| 2,409,907 | Shakesby | Oct. 22, 1946 |
| 2,450,173 | Uhri | Sept. 28, 1948 |
| 2,457,066 | Pepersack | Dec. 21, 1948 |